United States Patent [19]
Horikoshi

[11] Patent Number: 5,548,591
[45] Date of Patent: Aug. 20, 1996

[54] MULTI-POINT COMMUNICATION SYSTEM AND COMMUNICATION TERMINAL STATION APPARATUS

[75] Inventor: Hiroki Horikoshi, Kawasaki, Japan

[73] Assignee: Canon Kabushiki Kaisha, Tokyo, Japan

[21] Appl. No.: 362,990

[22] Filed: Dec. 23, 1994

[30] Foreign Application Priority Data

Dec. 28, 1993 [JP] Japan .................................. 5-337730

[51] Int. Cl.$^6$ .................................................. H04M 3/42
[52] U.S. Cl. ............................................. 370/62; 379/202
[58] Field of Search ........................ 370/62, 85.1, 85.4, 370/85.5, 85.12, 85.14, 85.15, 94.1, 60, 112, 60.1, 94.3; 340/825.05; 379/220, 201, 202; 348/15, 16, 17; 359/119, 118, 117

[56] References Cited

U.S. PATENT DOCUMENTS 5,422,883  6/1995  Hauris et al. ............................ 370/62
5,422,942  6/1995  Kakwashima ............................ 370/62

Primary Examiner—Douglas W. Olms
Assistant Examiner—Dang Ton
Attorney, Agent, or Firm—Fitzpatrick, Cella, Harper & Scinto

[57] ABSTRACT

A multi-point communication system comprising a communication terminal station apparatus which is connected to a communication line constructing a loop and includes a recognition unit to recognize connection formations of other plurality of communication terminal stations for the loop constructed by the communication line, a separation unit to separate reception information inputted in correspondence to the other enclosed communication terminal stations, a determination unit to determine whether each of the separation reception information separated by the separation unit is relayed and transmitted or not on the basis of each of the terminal connection formations recognized by the recognition unit, and a transmission unit to relay and transmit the separation reception information on the basis of the determination unit, and the communication line constructing the loop to which a plurality of such terminal station apparatuses are connected.

12 Claims, 7 Drawing Sheets

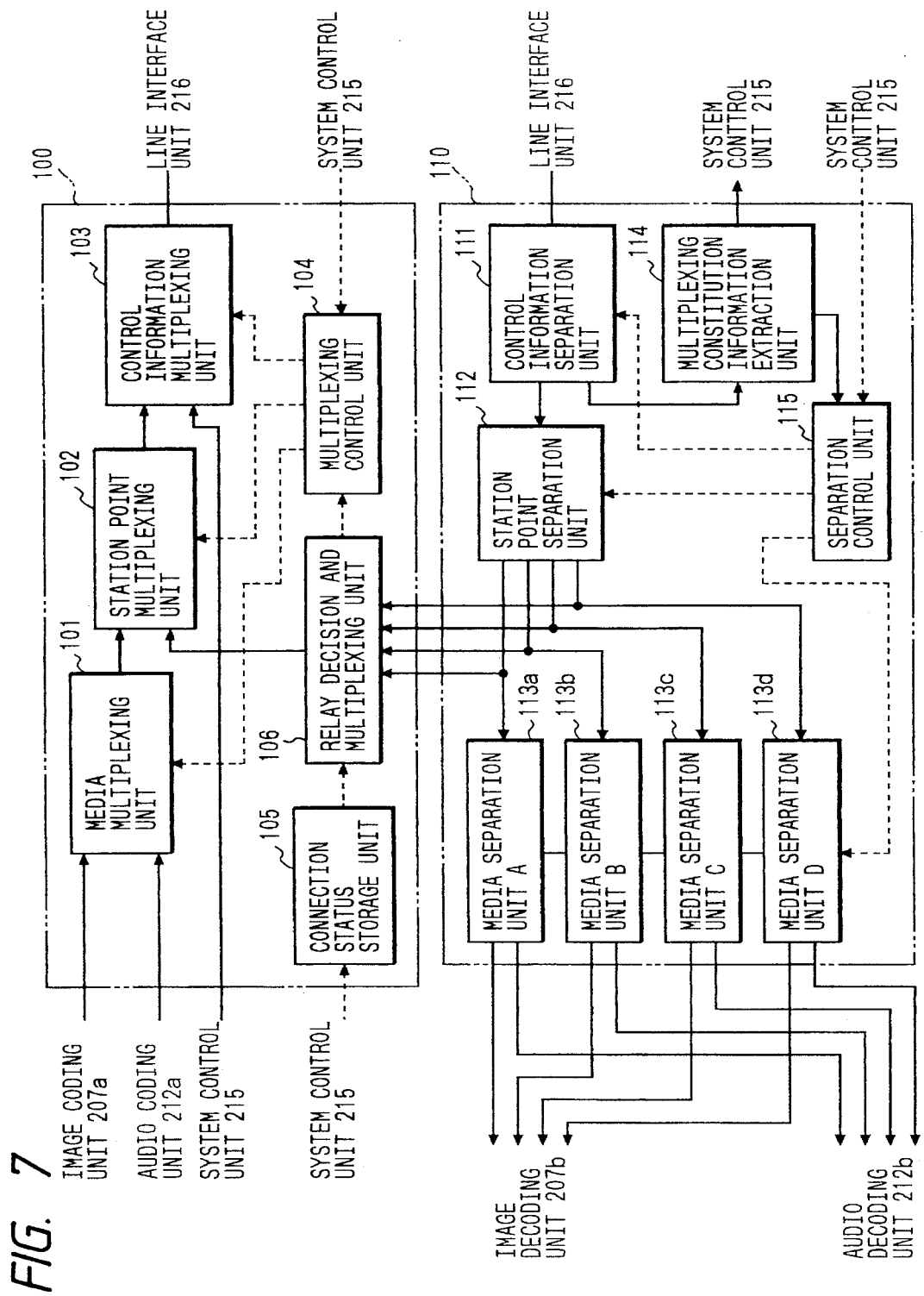

MULTI-POINT COMMUNICATION SYSTEM AND COMMUNICATION TERMINAL STATION APPARATUS

BACKGROUND OF THE INVENTION

1. Field of the Invention

The invention relates to a multi-point communication system for performing communication by connecting communication stations at multiple points and to a communication terminal station apparatus constructing such a system.

2. Related Background Art

In recent years, the development of the image compression coding technique and the spread of the digital communication line have been remarkable. The recommendations of the service regulations and protocol regulations for AV (Audio Visual) services in a TV conference system or the like, regulations for multimedia multiplexing frame construction, and the like are completely provided. Various terminal stations as well as TV telephone apparatus, TV conference systems, etc. have been proposed.

Among them, a multi-point TV conference system for performing a conference by connecting terminal stations at three or more points is highlighted.

In the multi-point TV conference system, generally, a multi-point TV conference is realized by mutually connecting the TV conference terminal stations by using an inter multi-point communication control apparatus (hereinafter, simply abbreviated to an MCU).

There has also been proposed a system for realizing a multi-point TV conference system by connecting TV conference terminal stations to a communication line in a ring or chain shape and by relaying predetermined data at each station. Specifically speaking, a data region is allocated to each station and is circulated, thereby updating the data inserted in a local station at every station.

The conventional multi-point TV conference system as mentioned above, however, has the following problems.

First, in the former system, since the multi-point TV conference system is realized by connecting all of the TV conference terminal stations to the MCU and by monitoring and controlling all of the TV conference terminal stations and the portions among them by the MCU, there are the following problems.

(1) The conference cannot be realized in the case where the MCU is in an inoperable state, the case where the MCU is used by another multi-point TV conference, or the like.

(2) Since a plurality of communication control circuits and the like for connecting a plurality of stations are needed, the MCU main body is very expensive.

(3) There is a limitation in the number of participants of the conference depending on a terminal station (line) accommodating ability of the MCU.

On the other hand, in the latter system, namely, in the system such that the TV conference terminal stations are connected to the communication line in a ring or bus shape and the data region is allocated to each station and circulated data is relayed and the data region of the local station is updated, although there is an advantage such that the MCU is unnecessary, since all of the data is circulated, the data stored in the local station is also received at each station. It will be obviously understood that since the reception of the data inserted by the local station is a substantially meaningless operation, the data which essentially has no meaning always occupies a part of the line.

In a digital communication network represented by the ISDN (Integrated Services Digital Network) or the like, although bidirectional transmission can be performed between the stations, in the conventional system, two loops in the opposite directions are not always efficiently used. Particularly in the transmission of moving image information, consequently, since the information amount is extremely large, there occur problems such that not only is the line not effectively used but also there is a case where another useful information cannot be transmitted.

The above problems generally occur without limitation to the moving image or the image communication.

SUMMARY OF THE INVENTION

Under such circumstances, it is an object of the invention to provide an excellent multi-point communication system and a communication terminal station apparatus which can realize, for example, a multi-point TV conference which effectively uses a line without using an MCU or an expensive apparatus in place of such an MCU.

According to one preferred embodiment of the invention, the above object is accomplished by a multi-point communication system having a plurality of communication terminal stations connected to a communication line constructing a loop, wherein each communication station comprises: recognizing means for recognizing connection formations of the other plurality of communication stations for the loop constructed by the communication line; separating means for separating reception information inputted in correspondence to the other communication stations accommodated; determination means for determining whether each of the separation reception information separated by the separating means is relayed and transmitted or not on the basis of each station connection formations recognized by the recognizing means; and transmitting means for relaying and transmitting the separation reception information on the basis of the result of the determination by the determination means.

According to another preferred embodiment, there is also provided a communication terminal station apparatus connected to a communication line constructing a loop, comprising: recognizing means for recognizing connection formations of the other plurality of communication terminal stations for a loop constructed by the communication line; separating means for separating reception information inputted in correspondence to the other communication stations accommodated; determination means for determining whether each of the separation reception information separated by the separating means is relayed and transmitted or not on the basis of each station connection formations recognized by the recognizing means; and transmitting means for relaying and transmitting the separation reception information on the basis of the result of the determination by the determination means.

Other objects, features and advantages of the invention will become apparent from the following detailed description taken in conjunction with the accompanying drawings.

BRIEF DESCRIPTION OF THE DRAWINGS

FIG. 7 is a constructional block diagram of a separation and multiplexing unit 214 in FIG. 2;

DETAILED DESCRIPTION OF THE PREFERRED EMBODIMENTS

A multi-point TV conference system according to an embodiment of the present invention will now be described hereinbelow.

Figure 1:
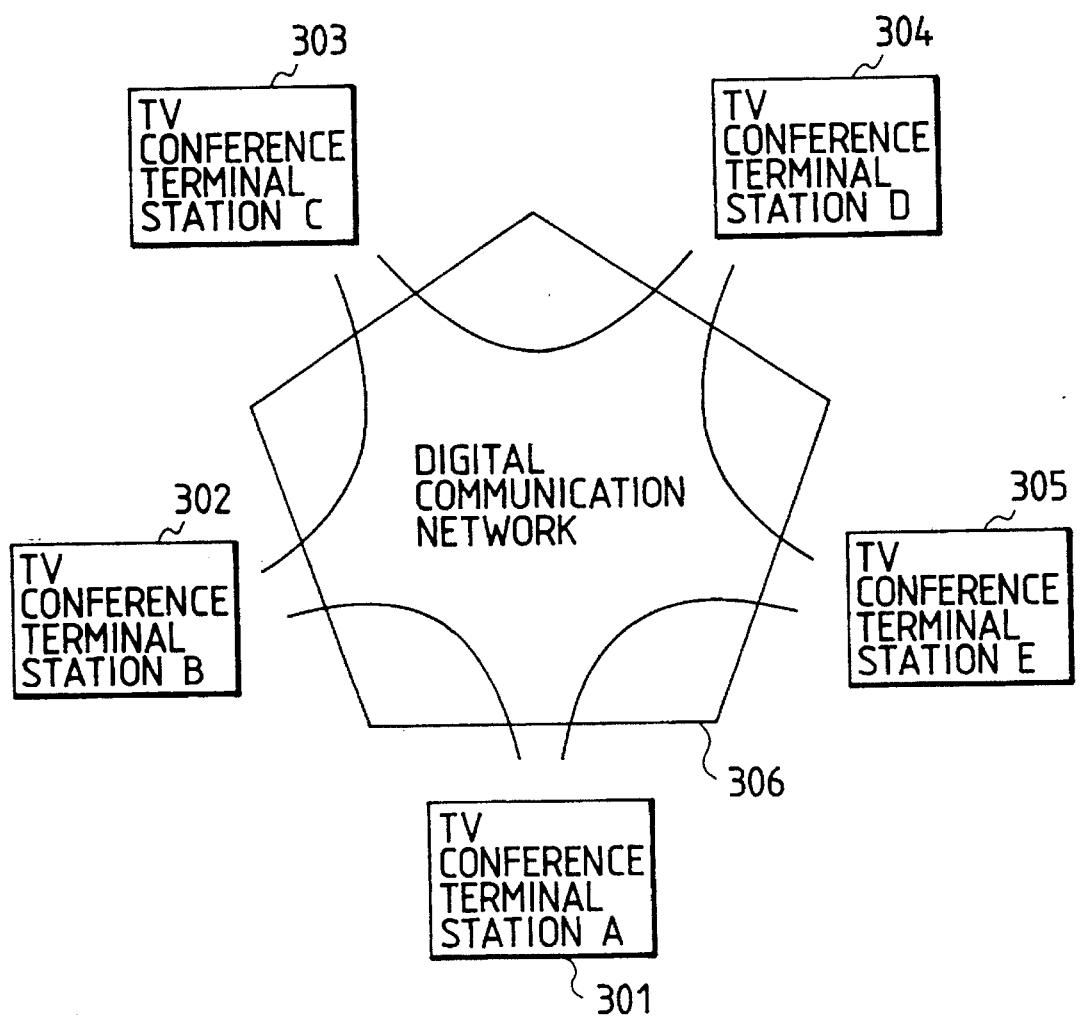
FIG. 1 is a schematic diagram showing a constructional example of a multi-point TV conference system according to an embodiment of the invention.

FIG. 1 is a schematic diagram showing a constructional example of the multi-point TV conference system according to the invention. An explanation will now be made with respect to the case where the number of terminal stations (station points) connected to a communication line is set to 5.

In FIG. 1, reference numerals 301, 302, 303, 304, and 305 denote TV conference terminal stations A, B, C, D, and E and 306 indicates a digital communication network such as an ISDN or the like.

The stations are connected in a loop shape by a digital line. Namely, the TV conference terminal station A 301 is connected to the TV conference terminal stations B 302 and E 305. The TV conference terminal station B 302 is connected to the TV conference terminal stations C 303 and A 301. The TV conference terminal station C 303 is connected to the TV conference terminal stations D 304 and B 302. The TV conference terminal station D 304 is connected to the TV conference terminal stations C 303 and E 305. The TV conference terminal station E 305 is connected to the TV conference terminal stations D 304 and A 301.

The communication line can perform bidirectional transmission and can form two loops in opposite directions.

A communication frame which is constructed by data stored in each station is respectively circulated on the double communication lines each of which is constructed like a loop.

At each TV conference terminal station, reception data is processed in the local station and a part of the reception data is replaced by the data generated by the local station and is relayed and transmitted.

The TV conference terminal station according to an embodiment of the invention will now be described hereinbelow.

Figure 2:
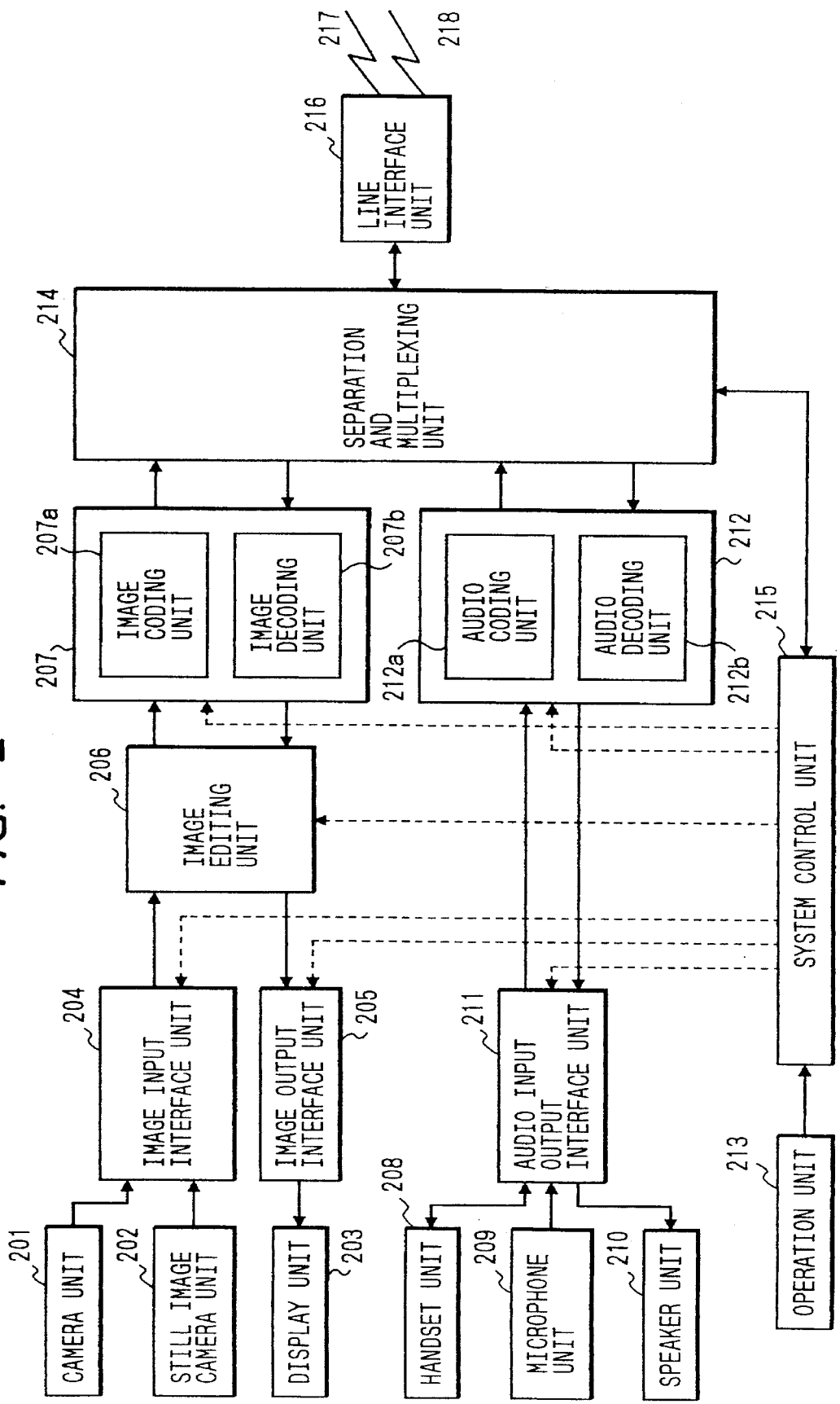
FIG. 2 is a constructional block diagram cur a TV conference terminal station according to an embodiment of the invention.

FIG. 2 is a constructional block diagram of a TV conference terminal station according to an embodiment of the invention.

In FIG. 2, reference numeral 201 denotes image input means and is a video camera unit for inputting a self image or the like; 202 one of image input means and is a still image camera unit for inputting an image such as drawing, map, sentence, or the like; and 203 a display unit for displaying the input image from the camera unit 201 or still image camera unit 202 or a reception image, an operation picture plane, or the like from the partner side.

Reference numeral 204 denotes an image input interface unit for performing a switching process or the like of the image input means by an instruction of a system control unit 215.

Reference numeral 205 denotes an image output interface unit for performing a switching process or the like of image output means.

Reference numeral 206 denotes an image editing unit for executing a picture-in-picture process, a screen freezing process, a display image selecting and synthesizing process, or the like by an instruction of the system control unit 215.

Reference numeral 207 denotes an image coding and decoding unit for performing a coding process of a transmission image signal and a decoding process of a reception image signal; 207a an image coding unit in the image coding and decoding unit 207; and 207b an image decoding unit in the image coding and decoding unit 207.

Reference numeral 208 denotes a handset unit as audio input and output means; 209 a microphone unit as audio input means; and 210 a speaker unit audio output means.

Reference numeral 211 denotes an audio input output interface unit for executing an echo cancelling process, a process for producing a dial tone, a call sound, a busy tone, a reception tone, or the like, a switching process of the audio input and output means, an audio synthesizing process, or the like by an instruction of the system control unit 215.

Reference numeral 212 denotes an audio coding and decoding unit for executing a coding process of a transmission audio signal and a decoding process of a reception audio signal by an instruction of the system control unit 215; 212a an audio coding unit in the audio coding and decoding unit 212; and 212b an audio decoding unit in the audio coding and decoding unit 212.

Reference numeral 213 denotes an operation unit such as keyboard, touch panel, or the like which is used to input control information to perform a whole control of the apparatus.

Reference numeral 214 denotes a separation and multiplexing unit for multiplexing an image signal, an audio signal, and a control signal on a transmission frame unit basis and for separating a reception frame into the image signal, audio signal, and control signal, and for supplying those signals to each unit. The detailed construction and functions of the separation and multiplexing unit 214 will be described hereinlater.

Reference numeral 215 denotes the system control unit comprising a CPU, an ROM, an RAM, an auxiliary storage device, and the like. The system control unit 215 monitors a status of each unit and executes the control of the whole apparatus, the formation of an operation and display picture plane according to the status, the execution of an application program, and the like.

Reference numeral 216 denotes a line interface unit to control the line in accordance with an ISDN user network interface.

Reference numeral 217 denotes a communication line X and 218 indicates a communication line Y.

To enable the multi-point image and audio communication, the image decoding unit 207b and audio decoding unit 212b can execute decoding processes of a plurality of coding image information and coding audio information, respectively. The image output interface unit 205 and audio input output interface unit 211 can execute selecting and synthesizing processes for a plurality of reception images and reception audio signals, respectively.

The fundamental operation when executing the one-to-one communication of the TV conference terminal stations in the above construction will now be described.

The input image from the camera input unit 201 or still image camera input unit 202 is supplied to the image coding unit 207a through the image input interface unit 204 and image editing unit 206.

The input audio signal from the handset unit 208 or microphone unit 209 is supplied to the audio coding unit 212a through the audio input output interface unit 211.

The input image coded by the image coding unit 207a and the input audio signal coded by the audio coding unit 212a are multiplexed by the separation and multiplexing unit 214 and the multiplexed data is transmitted to the communication line Y 218 through the line interface unit 216.

On the other hand, the reception signal from the communication line 217 is separated into the image signal and the audio signal by the separation and multiplexing unit 214 through the line interface unit 216 and supplied to the image decoding unit 207b and audio decoding unit 212b, respectively.

The reception image decoded by the image decoding unit 207b is displayed by the display unit 203 through the image editing unit 206 and image output interface unit 205. The reception audio signal decoded by the audio decoding unit 212b is supplied to the handset unit 208 or speaker unit 210 through the audio input output interface unit 211.

Figure 3:
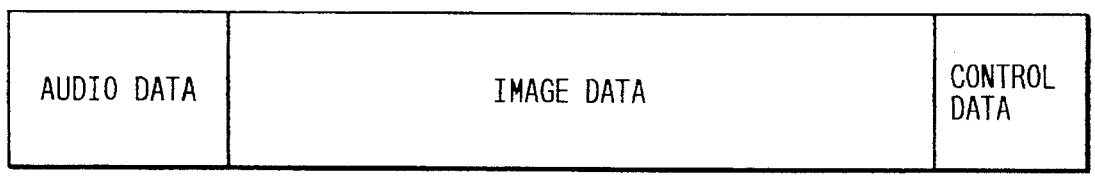
FIG. 3 is a diagram showing a constructional example of a multiplexing frame of various information, namely, image information, audio information, and control information.

FIG. 3 shows a constructional example of a multiplexing frame of various information, namely, image information, audio information, and control information.

The specific construction and operation at the time of an inter multi-point communication of three or more station points will now be described hereinbelow by paying attention to the TV conference terminal station A 301 (hereinafter, "local station" denotes the TV conference terminal station A 301).

First, a flow of data when paying attention to the storage station in one constructional example of the multi-point TV conference system according to the invention will now be described with respect to a specific example.

Figure 4:
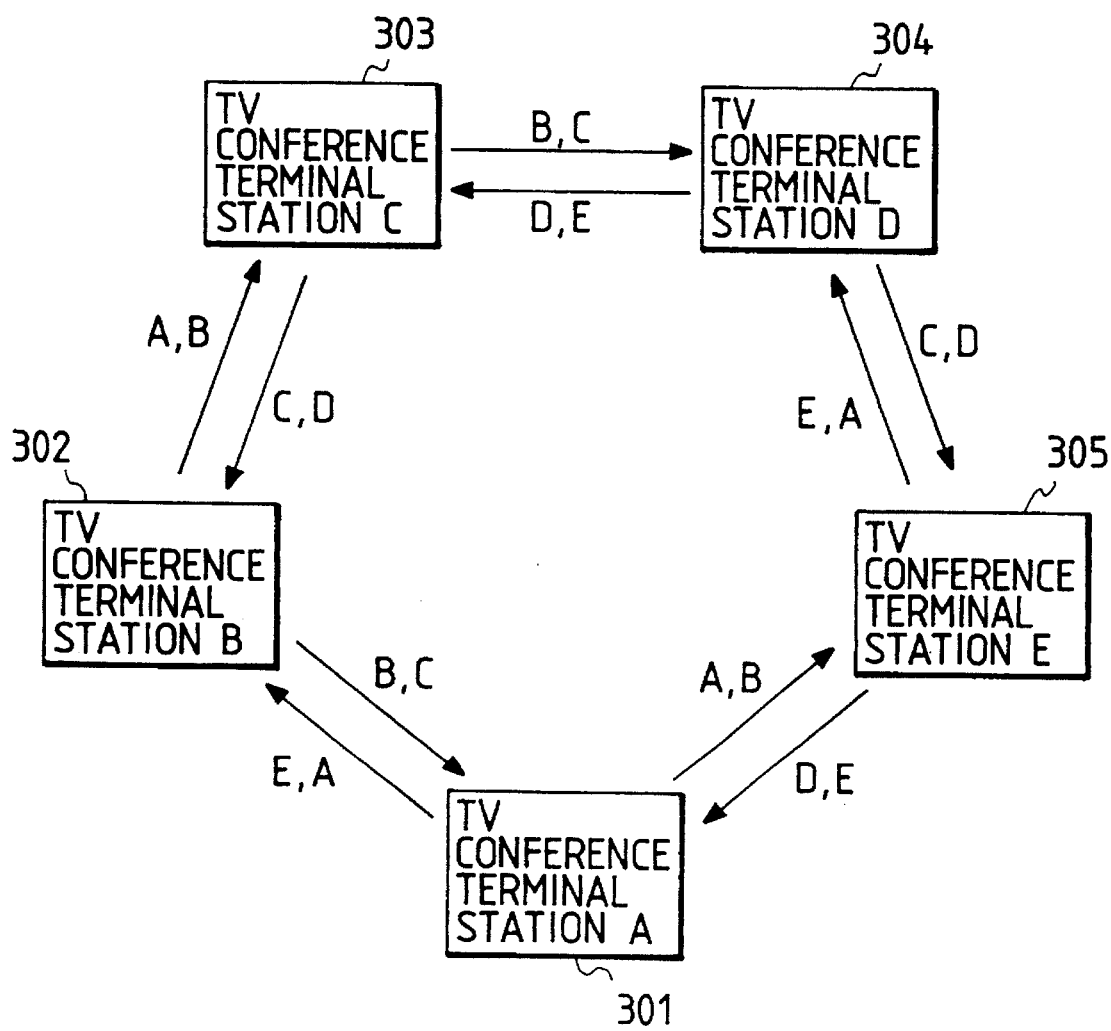
FIG. 4 is a diagram showing an example of a transmission path of storage data at each station in the 5-point loop connection according to an embodiment of the invention.

As shown in FIG. 4, storage data of only two stations is transmitted onto the lines connecting the terminal stations.

The TV conference terminal station A 301 will now be described. In the clockwise line, the information stored by the TV conference terminal stations D 304 and E 305 is received and the storage information by the TV conference terminal station E 304 and the information generated in the local station are transmitted to the TV conference terminal station B 302.

On the other hand, in the counterclockwise line, the information stored by the TV conference terminal stations B 302 and C 303 is received and the storage information by the TV conference terminal station B 302 and the information generated in the local station are transmitted to the TV conference terminal station E 305.

Each station executes a similar relay transmitting operation in accordance with the storage station of the reception information, so that the information generated at all of the TV conference terminal stations (A to E) is transmitted to all of the TV conference terminal stations.

The outline of the operation of the whole apparatus will now be described.

As mentioned above, the communication frame constructed by the data that is stored by each TV conference terminal station is transmitted on the loop which is constructed by the digital communication line.

An explanation will now be made hereinbelow by mainly paying attention to the clockwise transmission path.

The data is received from the TV conference terminal station E 305 through the digital communication network 306 (refer to FIG. 1). The reception data has a communication frame construction in which the data stored respectively by the TV conference terminal stations D 304 and E 305 were multiplexed.

Explanation will now be made hereinbelow with reference to FIG. 2.

In the separation and multiplexing unit 214, the reception frame data is first separated in accordance with the station which stored the information. The separated data is further separated by the kind of data.

The plurality of separated reception coding image data are sequentially transferred to the image decoding unit 207b and decoded. The decoded image data is displayed by the display unit 203 through the image editing unit 206 and image output interface unit 205.

Similarly, the plurality of separated reception coding audio data are supplied to the audio decoding unit 212b and decoded. The decoded audio data is outputted to the handset unit 208 or speaker unit 210 through the audio input output interface unit 211.

The control signal separated by the separation and multiplexing unit 214 is supplied to the system control unit 215.

Together with the execution of the above operation, the relay transmission of a predetermined region of the reception data is executed to the TV conference terminal B 302. In the relay transmitting operation in this instance, the reception frame data is not simply returned and transmitted but a process is executed in accordance with the storage station point (terminal station) of each data. Namely, in the received communication frame, the data region stored by the TV conference terminal station E 305 and the data region stored by the TV conference terminal station D 304 are separated. The storage data area in the TV conference terminal station E 305 and the data generated in the TV conference terminal station A are multiplexed and the multiplexed data is relayed and transmitted to the TV conference terminal station B 302.

Figure 5:
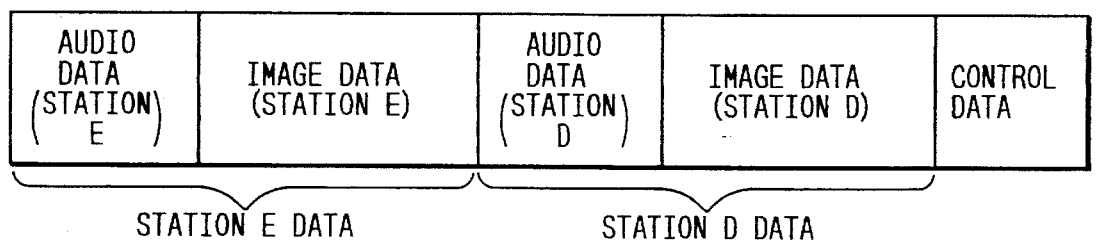
FIG. 5 shows a constructional example of a multiplexing frame of various information of reception data at a TV conference terminal station A in the clockwise direction in FIG. 4.

FIG. 5 shows a constructional example of a multiplexing frame of various information of the reception data in the TV conference terminal station A in the clockwise direction in FIG. 4.

Figure 6:
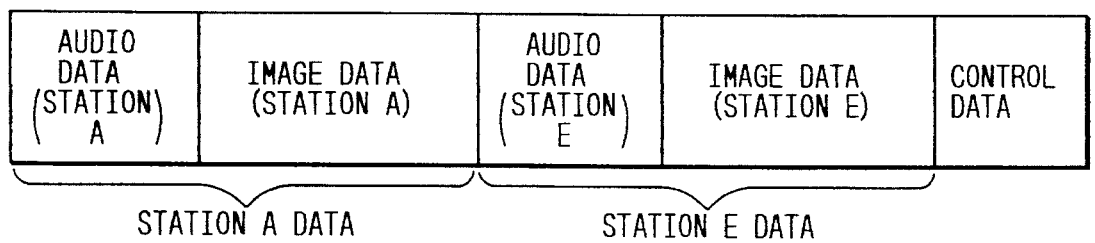
FIG. 6 shows a constructional example of a multiplexing frame of various information of transmission data at the TV conference terminal A in the clockwise direction in FIG. 4.

FIG. 6 shows a constructional example of a multiplexing frame of various information of transmission data in the TV conference terminal station A in the clockwise direction in FIG. 4.

A transmission rate of the communication line connecting the point terminal stations is assumed to be R and a transmission rate allocated to each station assumes R/2 (in case of the 5-point communication).

A functional block to realize the (clockwise) relay transmission as a characteristic function in the embodiment will now be described in detail.

A construction of the separation and multiplexing unit 214 for the clockwise transmission path will now be described.

FIG. 7 is a constructional block diagram of the separation and multiplexing unit 214 in FIG. 2.

In FIG. 7, reference numeral 100 denotes a multiplexing circuit and 110 a separation circuit.

A construction of the multiplexing circuit 100 will now be described.

Reference numeral 101 denotes a media multiplexing unit for multiplexing the coding image data at the local station which was inputted from the image coding unit 207a (refer to FIG. 2) and the coding audio data at the local station which was inputted from the audio coding unit 212a.

Reference numeral 102 denotes a station point multiplexing unit for multiplexing the data generated in the local station as an output of the media multiplexing unit 101 and the plurality of station point storage data as an output of a relay decision and multiplexing unit 106 (which will be explained hereinlater).

Reference numeral 103 denotes a control information multiplexing unit for multiplexing an output of the station point multiplexing unit 102 and control information, synchronous information, multiplexing constitution information, and the like from the system control unit 215 (refer to FIG. 2) and outputting as transmission multiplexing data to the line interface unit 216 (refer to FIG. 2).

Reference numeral 104 denotes a multiplexing control unit for controlling each unit of the multiplexing unit 100 on the basis of the multiplexing control information from the system control unit 215 (refer to FIG. 2) and an instruction of the relay decision multiplexing unit 106.

Reference numeral 105 denotes a connection status storage unit to which multi-point connection status information indicative of the number of connection stations, a connection formation, and the like in the multi-point communication is notified from the system control unit 215 and which holds and monitors the multi-point connection status information.

Reference numeral 106 denotes the relay decision and multiplexing unit for judging whether the information is relayed and transmitted in correspondence to the storage station point of the reception data or not on the basis of the multi-point connection status information held in the connection status storage unit 105 and the control information of the system control unit 215, thereby multiplexing each station point information to be relayed.

A construction of the separation circuit 110 will now be described hereinbelow.

Reference numeral 111 denotes a control information separation unit for separating control data such as control information, synchronous information, multiplexing constitution information, and the like in the reception multiplexing data inputted from the line interface unit 216 (refer to FIG. 2).

Reference numeral 112 denotes a station point separation unit to which the multiplexed plural point terminal station storage data as one output of the control information separation unit 111 is inputted and which separates such data every storage station point and outputs the separated data to media separation units 113a to 113d and relay decision and multiplexing unit 106, respectively.

Reference numerals 113a to 113d denote the media separation units A to D each for separating each point terminal station storage data into the image data and audio data and for outputting them to the image decoding unit 207b and audio decoding unit 212b.

Reference numeral 114 denotes a multiplexing constitution information extraction unit for separating and extracting the reception data multiplexing constitution information in the reception control data separated by the control information separation unit 111.

Reference numeral 115 denotes a separation control unit for controlling each unit in the separation circuit 110 in accordance with the multiplexing constitution information of the reception data separated and outputted by the multiplexing constitution information extraction unit 114.

The operation of the separation multiplexing unit 214 in the above construction (of the TV conference terminal station A 301) will now be described in detail.

The separating operation of the separation circuit 110 will now be described.

First, the reception data from the communication line is inputted to the separation circuit 110 in the separation multiplexing unit 214 through the line interface unit 216 (FIG. 2). As reception data to be inputted, a communication frame in which the image data, audio data, control data, and the like were multiplexed is inputted. The control information separation unit 111 separates the reception data inputted from the line interface unit 216 into the image data/audio data and the control information. The separated control information is inputted to the multiplexing constitution information extraction unit 114 and is transmitted as is to the system control unit 215. Only the multiplexing constitution information of the data is extracted from the reception control information and is notified to the separation control unit 115. On the basis of the inputted multiplexing constitution control information, the separation control unit 115 controls the separating processes of the station point separation unit 112 and media separation units A 113a to D 113d, respectively. The multiplexed plural point terminal station storage data is inputted to the station point separation unit 112. In accordance with the station point separation control information of the separation control unit 115, the station point separation unit 112 separates the inputted data every storage station point (each station) and supplies the separated data to the media separation units A 113a to D 113d and relay decision and multiplexing unit 106. Each of the media separation units A 113a to D 113d separates each point terminal station storage data as an output of the station point separation unit 112 into the image data and audio data and supplies them to the image decoding unit 207b (refer to FIG. 2) and audio decoding unit 212b (refer to FIG. 2).

Namely, as for the reception data, the control data is first separated and is subsequently separated in accordance with the storage station point (each station) and is further separated in accordance with the data kind and is transmitted to the processing circuit in the local station, respectively. For the relay transmission, the reception data separated every storage station point is supplied to the relay decision and multiplexing unit 106. Specifically speaking, with respect to the clockwise transmission path in the 5-point communication, the data of the communication frame unit transmitted from the TV conference terminal station E 305 is separated into the storage data of the TV conference terminal station D 304 and the storage data and control information of the TV conference terminal station E 305. Each of those data is further separated into the image data and audio data. Although the explanation has been made with respect to the 5-point communication, since the number of storage point terminal stations to actually receive the data is equal to 2, the media separation units C 113c and D 113d actually do not operate.

The multiplexing operation of the multiplexing circuit 100 will now be described.

The multiplexing control in the media multiplexing unit 101, station point multiplexing unit 102, and control information multiplexing unit 103 is fundamentally executed by the multiplexing control unit 104. The coded image data and audio data are inputted to the media multiplexing unit 101 from the image coding unit 207a (refer to FIG. 2) and audio coding unit 212a (refer to FIG. 2) in the local station. Those image data and audio data are multiplexed in accordance with the multiplexing control of the multiplexing control unit 104 and the multiplexed data is supplied to the station point multiplexing unit 102. The station point multiplexing unit 102 multiplexes the generation data of the local station as an output of the media multiplexing unit 101 and the plurality of station point storage data as an output of the relay decision and multiplexing unit 106 and supplies the multiplexed data to the control information multiplexing unit 103. The control information multiplexing unit 103 multiplexes the output of the station point multiplexing unit 102 and the control information, synchronous information, multiplexing constitution information, and the like from the system control unit 215 (refer to FIG. 2) and supplies as transmission multiplexing data to the line interface unit 216 (refer to FIG. 2). On the other hand, multi-point connection status information indicative of the number of connection terminals, connection formation, and the like in the multi-point communication is inputted and stored into the connection status storage unit 105 from the system control unit 215 and is notified to the relay decision and multiplexing unit 106. When the connection status is changed, the information is immediately updated to the newest information by the system control unit 215. The multiplexing control unit 104 executes the multiplexing control in the media multiplexing unit 101, station point multiplexing unit 102, and control information multiplexing unit 103 on the basis of the result of the judgment of the multiplexing every station point from the relay decision and multiplexing unit 106 and the multiplexing constitution designation information from the system control unit 215.

The relay judging operation and multiplexing operation in the relay decision and multiplexing unit 106 will now be described in detail with respect to a specific example. The relay transmitting system shown in FIG. 4 will now be described as an example. The reception data (station point data) is inputted to the relay decision and multiplexing unit 106 every storage point which was separated and outputted by the station point separation unit 112. Whether the data is relayed and transmitted in correspondence to the storage station point of the reception data or not is decided in accordance with the multi-point connection format information input held in the connection status storage unit 105 and the relay control information from the system control unit 215. For example, in the relay transmission system of FIG. 4, the farthest point terminal station in the multi-point connection is first recognized by the connection information stored in the connection status storage unit 105. Each of the inputted station point data is made correspond to the connection status and the station point data of the farthest terminal station is discriminated. A control is performed so as not to relay and transmit the station point storage data of the farthest station and to relay and transmit the station point storage data of the other stations. Further, the decided station point storage data to be relayed and transmitted is multiplexed and the multiplexed data is supplied to the control information multiplexing unit 103.

Namely, the multi-point connection status is always grasped and whether each of the station point data separated by the station point separation unit 112 every storage station point is relayed and transmitted or not is decided. In the relay transmission system of FIG. 4, the reception station point data excluding the data stored by the farthest point terminal station on the multi-point connection is multiplexed. The multiplexed data is further multiplexed to the data generated in the local station and is multiplexed to the control data, sync signal, or the like. After that, the final multiplexed data is outputted to the next station on the transmission destination side. Specifically speaking, with respect to the clockwise transmission path in the 5-point communication, as for the storage data of the TV conference terminal station D 304 and the storage data of the TV conference terminal station E 305 which were transmitted and separated from the TV conference terminal station E 305, a control is performed so as not to relay the storage data of the TV conference terminal station D 304. Only the storage data of the TV conference terminal station E 305 and the data generated in the local station (TV conference terminal station A 301) are multiplexed and the multiplexed data is transmitted to the TV conference terminal station B 302 as a next transmission destination.

Although the explanation has been made by paying attention to the clockwise transmission path, substantially the same circuit for the counterclockwise transmission path as that of the foregoing separation and multiplexing unit 214 actually exists and executes similar processes. The counterclockwise transmission path will now be simply explained. First with respect to the separation circuit, the data on the communication frame unit received from the TV conference terminal station B 302 is separated into the storage data of the TV conference terminal station B 302 and the storage data of the TV conference terminal station C 303 and the control information. Each of the separated data is separated into the image data and audio data. On the other hand, with regard to the multiplexing circuit, only the storage data of the TV conference terminal station B 302 and the data generated in the local station (TV conference terminal station A 301) are multiplexed. The multiplexed data is transmitted to the TV conference terminal station E 305 as a next transmission destination side.

Figure 8:
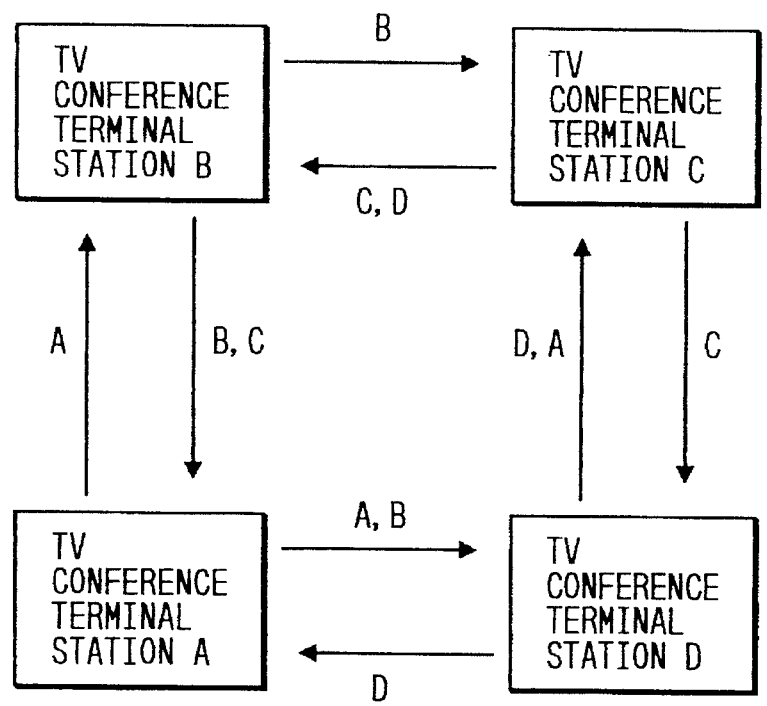
FIG. 8 is a diagram showing an example of a transmission path of storage data at each station in the 4-point loop connection according to an embodiment of the invention.
Figure 9:
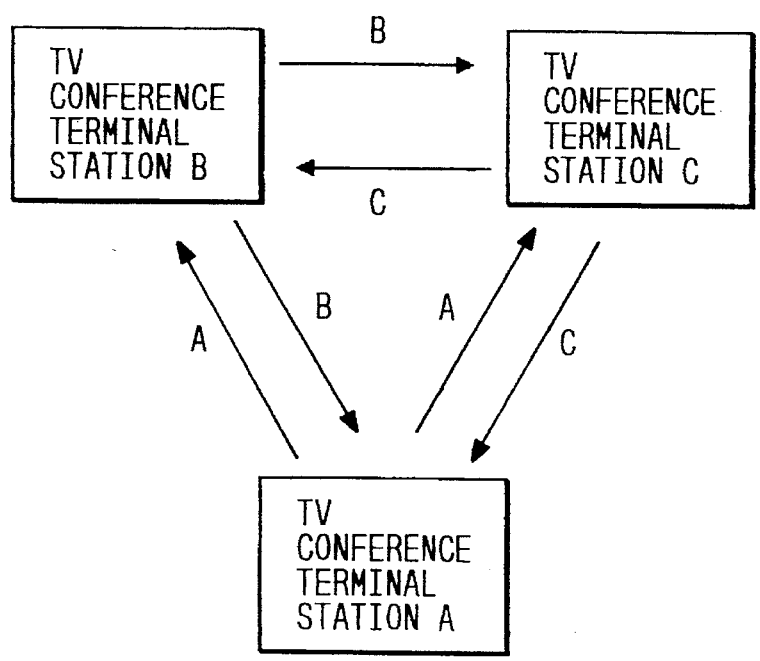
FIG. 9 is a diagram showing an example of a transmission path of storage data at each station in the 3-point loop connection according to an embodiment of the invention.

FIGS. 8 and 9 are diagrams showing examples of transmission paths of the storage data of each station in the 4-point loop connection and 3-point loop connection. In case of the 3-point communication, the relay is unnecessary and a control is performed so as not to relay and transmit all of the reception data.

Figure 10:
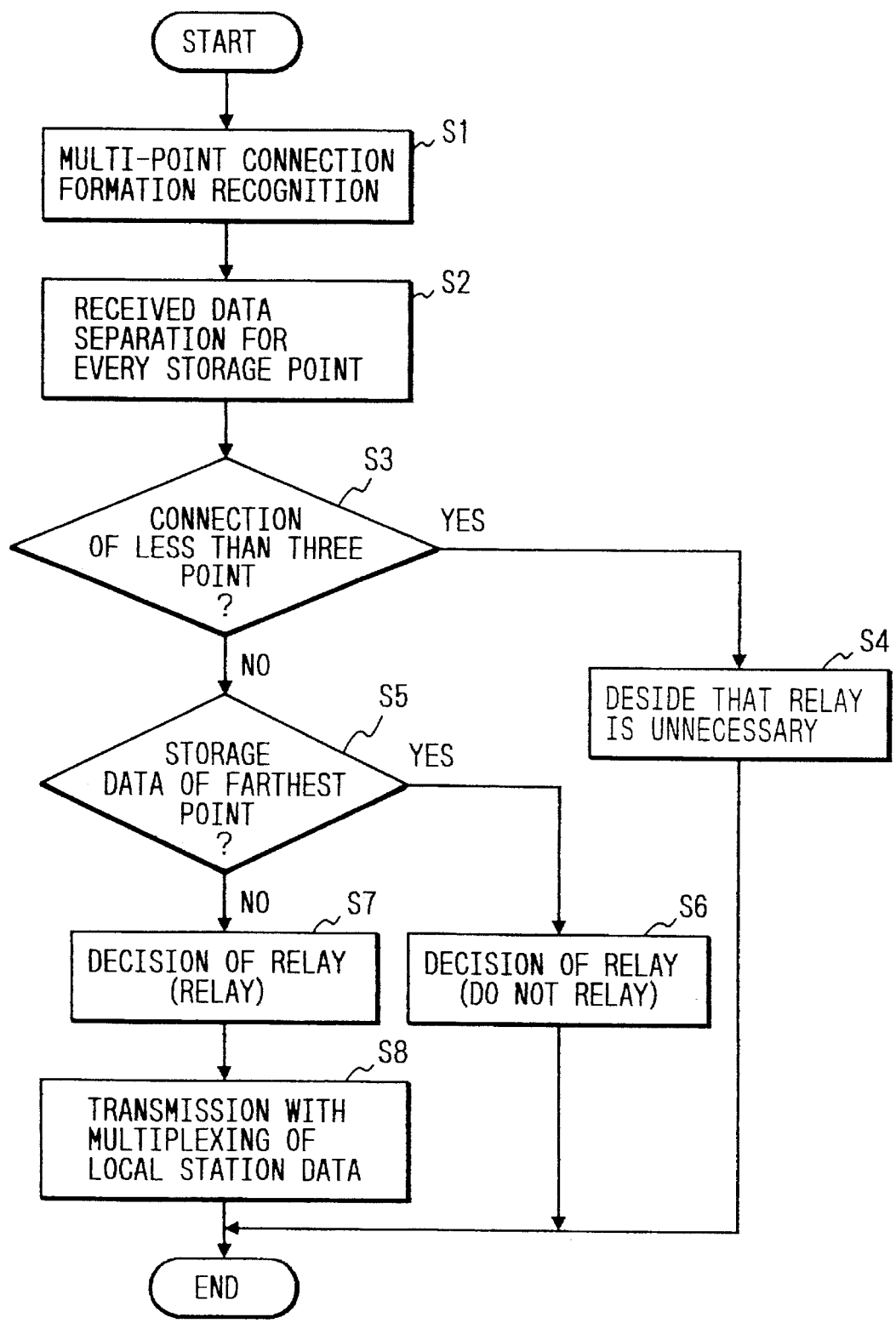
FIG. 10 is a flowchart showing the relay decision control operation of reception data in a relay decision and multiplexing unit 106.

FIG. 10 is a flowchart showing an example of the relay decision control operation of the reception data in the relay decision and multiplexing unit 106.

A multi-point connection formation, particularly, the number of stations connected and the farthest terminal station point on the connection are recognized by the notification or the like from the system control unit (step S1). The multi-point connection formation is updated not only at the start of the communication but also in the case where the connection format is changed. When the data is received, the reception data is first separated every storage station point of the data by the multiplexing constitution information (S2). A check is made to see if the number of connection station points is equal to or larger than 4 or not (S3). When the number of connection points is less than 3, a decision is made so as not to relay and transmit (S4). When it is equal to or larger than 4, with respect to each of the reception data separated every storage station point, a check is made to see if the storage terminal station is the station at the farthest point in the multi-point connection or not (S5). As a result of the discrimination, a decision is made so as not to relay and transmit the storage data of the farthest station (S6). A control is performed so as to relay and transmit the other data (of the stations other than the farthest station) (S7). Further, the relayed and transmitted data is multiplexed to the data generated in the local station and the multiplexed data is transmitted to the next relay transmission destination side (S8). This is because with respect to the farthest station, since the data has already been transferred to all of the stations by the clockwise or counterclockwise relay, there is no need to newly relay in this instance.

By the above operations, the communication frame constructed by the data which is stored by a plurality of TV conference terminal stations is circulated on the loop formed by the digital communication line. Each TV conference terminal station always monitors the number of connection stations, connection formation, and the like in the multi-point connection and separates and processes the reception data every storage station point. Further, the decision whether or not the separated data is relayed and transmitted is made in accordance with the connection status of the storage station point. As an example, a control is performed so as not to relay and transmit the data stored by the farthest point station on the multi-point connection and to relay and transmit the data stored by the other point stations. The relayed and transmitted data is multiplexed to the data generated in the local station. The multiplexed data is subsequently relayed and transmitted to the next transmission side. Consequently, an efficient multi-point TV conference system effectively using the communication line is realized.

The present invention can be embodied by other various forms without departing from the spirit and main features of the invention.

For example, although the above embodiment has been described with respect to the case of using the image information and audio information as data which is transmitted by each TV conference terminal station, the invention is not limited to such an example. It will be obviously understood that the invention can be directly applied to other various information which is effective to a (multi-point) TV conference, further, to control information or the like for controlling the inter multi-point communication or terminal stations without performing the image communication. Although the embodiment has been described with respect to the multi-point TV conference as an example, the invention can be also obviously applied to other multi-point communications.

Further, although the embodiment has been described above with respect to the case where whether the relay of the data to be stored in each station permitted or inhibited is uniformly judged with respect to all of the data to be stored in the stations, such a control can be also combined to another control to discriminate the permission or inhibition of the relay according to the kind of data such as image, audio, or the like.

Further, although the embodiment has been described above with respect to the case where the uniform rate has been set with regard to each station point in the communication frame, it is also possible to allocate and use a rate that is different every station or a variable rate. Another rate can be also allocated for control to transmit and circulate the control data of the inter multi-point communication or the like.

Moreover, although the embodiment has been described above with respect to the case where five points are mainly connected in a ring shape, the number of points, the connection formation, and the like are not limited to such an example. The invention can be also applied to other various connection formats such that the number of points is set to 4 or less or 6 or more and that the stations are connected in a shape like a ring, chain, or the like.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A multi-point communication system having a first plurality of communication terminal stations connected to a communication line constructing a loop, wherein each one of said communication terminal stations comprises:

a) recognizing means for recognizing connection formations to a second plurality of others of said communication terminal stations in the loop constructed by said communication line;

b) separating means for separating combined reception information received over said communication line from at least one of said second plurality of said communication terminal stations to provide respective separated reception information;

c) determination means for determining whether each of the separated reception information, separated by said separating means, is to be relayed and transmitted or not on the basis of each of the terminal station connection formations recognized by said recognizing means; and d) transmitting means for selectively relaying and transmitting the separated reception information on the basis of the determination by said determination means.

2. A system according to claim 1, wherein said transmitting means multiplexes the separated reception information which was determined by said determination means to be transmitted and information generated in said one communication terminal station to form multiplexed information, and transmits the multiplexed information.

3. A system according to claim 1, wherein each of said communication terminal stations relays and transmits relay information based on reception information from an upstream terminal station to a downstream terminal station and relays and transmits relay information based on reception information from a downstream terminal station to an upstream terminal station.

4. A system according to claim 3, wherein said determination means determines not to relay and transmit the separated reception information corresponding to a farthest communication terminal station from said one communication terminal station.

5. A system according to claim 3, wherein said determination means determines not to relay and transmit reception information in the case where a number of communication terminal stations connected to said communication line is less than 3.

6. A communication terminal station which is connected to a communication line constructing a loop, comprising:

a) recognizing means for recognizing connection formations to a plurality of other communication terminal stations in the loop constructed by the communication line;

b) separating means for separating reception information received over the communication line from at least one of the plurality of other communication terminal stations to provide respective separated reception information;

c) determination means for determining whether each of the separated reception information, separated by said separating means, is to be relayed and transmitted or not on the basis of each of the terminal station connection formations recognized by said recognizing means; and d) transmitting means for selectively relaying and transmitting said separated information on the basis of the determination by said determination means.

7. A station according to claim 6, wherein said transmitting means multiplexes relay information and information generated in said communication terminal station and transmits the multiplexed information.

8. A station according to claim 6, wherein said communication terminal station relays and transmits relay information based on reception information from an upstream terminal station to a downstream terminal station and relays and transmits relay information based on reception information from a downstream terminal station to an upstream terminal station.

9. A station according to claim 8, wherein said determination means determines to relay and transmit the separated reception information received from a farthest terminal station from said station.

10. A station according to claim 8, wherein said determination means determines not to relay and transmit reception information in the case where a number of terminal stations connected to said communication line is less than 3.

11. A system according to claim 1, wherein the combined reception information includes reception information from at least two of said second plurality of said communication terminal stations.

12. A system according to claim 6, wherein the combined reception information includes reception information from at least two of the plurality of other communication terminal stations.

\* \* \* \* \*